US008948256B2

(12) United States Patent
Pandit et al.

(10) Patent No.: US 8,948,256 B2
(45) Date of Patent: Feb. 3, 2015

(54) REFERENCE PICTURE LIST MANAGEMENT SYNTAX FOR MULTIPLE VIEW VIDEO CODING

(75) Inventors: Purvin Bibhas Pandit, Franklin Park, NJ (US); Yeping Su, Vancouver, WA (US); Peng Yin, West Windsor, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 352 days.

(21) Appl. No.: 12/311,190

(22) PCT Filed: Oct. 12, 2007

(86) PCT No.: PCT/US2007/021842
§ 371 (c)(1),
(2), (4) Date: Mar. 20, 2009

(87) PCT Pub. No.: WO2008/048499
PCT Pub. Date: Apr. 24, 2008

(65) Prior Publication Data
US 2009/0262804 A1   Oct. 22, 2009

Related U.S. Application Data

(60) Provisional application No. 60/851,863, filed on Oct. 13, 2006, provisional application No. 60/851,521, filed on Oct. 13, 2006.

(51) Int. Cl.
H04B 1/66 (2006.01)
H04N 19/61 (2014.01)
(Continued)

(52) U.S. Cl.
CPC ... *H04N 19/00781* (2013.01); *H04N 19/00769* (2013.01); *H04N 19/00884* (2013.01); *H04N 19/00721* (2013.01); *H04N 19/00545* (2013.01)
USPC .................................................. 375/240.12

(58) Field of Classification Search
USPC ................ 375/130–153, 240.01–240.29; 704/500–504
IPC ............... H04B 1/66; H04N 7/12,11/02, 11/04, H04N 7/24, 7/26
See application file for complete search history.

(56) References Cited

U.S. PATENT DOCUMENTS 7,782,943 B2 * 8/2010 Jeon et al. ................. 375/240.12
2006/0146143 A1 * 7/2006 Xin et al. .................... 348/218.1
(Continued)

FOREIGN PATENT DOCUMENTS

JP   2004274694    9/2004
JP   2008182669    8/2008
(Continued)

OTHER PUBLICATIONS

1.R. Schafer, T. Wiegand and H. Schwarz "The emerging H.264/AVC standard", EBU Tech. Rev., pp. 12 2003.*
(Continued)

*Primary Examiner* — Richard Torrente
*Assistant Examiner* — Frank Huang
(74) *Attorney, Agent, or Firm* — Vincent E. Duffy; Joel M. Fogelson

(57) ABSTRACT

A picture reference list ordering process is defined for a multiview coder for coding moving pictures, where the picture list has the coding order of reference pictures used to code a picture specified in relationship to whether a picture to be coded is associated with a view. The ordering of the picture list will therefore change the coding order of the reference pictures in the picture reference list depending on the temporal relationships the reference pictures have with the picture to be coded and views associated with the reference picture.

8 Claims, 9 Drawing Sheets

(51) Int. Cl.
H04N 19/597 (2014.01)
H04N 19/70 (2014.01)
H04N 19/577 (2014.01)
H04N 19/46 (2014.01)

(56) References Cited

U.S. PATENT DOCUMENTS

2007/0211796 A1* 9/2007 Kim .................... 375/240.01
2008/0089428 A1 4/2008 Nakamura et al.

FOREIGN PATENT DOCUMENTS

| WO | WO2006001653 | | 1/2006 |
| WO | 2006062377 | A1 | 6/2006 |
| WO | WO2007081178 | | 7/2007 |
| WO | WO2007114612 | | 10/2007 |

OTHER PUBLICATIONS

Li et al., "A Novel Multi-View Video Coding Scheme Based on H.264," Information, Communications and Signal Processing, Proceedings of 2003 Fourth Pacific Rim Conference on Multimedia in Singapore, Dec. 15-18, 2003, Piscataway, NJ, USA, vol. 1, pp. 493-497, XP010703019.
Martinian et al., "V-Picture Syntax for Random Access in Multi-view Video Compression," ISO/IEC JTC1/SC29/WG11, Coding of Moving Pictures and Audio, Doc. M13121, Video Standards and Drafts, Mar. 23, 2006, XP-030041790, 6 pages.
Mueller et al., "Multiview Coding using AVC," ISO/IEC JTC1/SC29/WG11, Doc. M12945, Video Standards and Drafts, Jan. 11, 2006, XP-030041614, 12 pages.
Richardson et al., "Frame and picture management," Internet Citation, Jan. 29, 2004, XP002435299, 7 pages.
Vetro et al., "Joint Multiview Video Model (JMVM) 1.0, ," Joint Video Team of ISO/IEC MPEG & ITU-T VCEG, JVT-T208, 20$^{th}$ Meeting: Klagenfurt, Austria, Jul. 15-21, 2006, XP-002464353, 23 pages.
International Search Report, dated Apr. 17, 2008.
Sullivan et al., Draft of Version of H.264/AVC (ITU-T Recommendation H.264 and ISO/IEC 14496-10 (MPEG-4 part 10) Advanced Video Coding), JVT of ISO/IEC MPEG & ITU-T VCEG, Document: JVT-M050d4, Jan. 11, 2055.
Pandit et al., "On MVC High-Level Syntax for Picture Management", JVT of ISO/IEC MPEG & ITU-T VCEG, Document: JVT-T131, 20th Meeting, Klagenfurt, Austria, Jul. 15-21, 2006.
Vetro et al., "Joint Multiview Video Model (JMVM) 1.0", JVT of ISO/IEC MPEG & ITU-T VCEG, Document: JVT-T208, 20th Meeting: Klagenfurt, Austria, Jul. 15-21, 2006.
Bilen et al., "A Multi-View Video Codec Based on H.264", ICIP 2006, IEEE, 2006.
Schafer et al., "The Emerging H.264 AVC Standard" Audio/Video Coding, EBU Technical Review, Jan. 2003.

* cited by examiner

| ref_pic_list_reordering( ) { | C | Descriptor |
|---|---|---|
|   if( slice_type != I && slice_type != SI && slice_type != EI ) {<br>        /* slice_type EI is specified in Annex Error!<br>Reference source not found. */ | | |
|     ref_pic_list_reordering_flag_10 | 2 | u(1) |
|     if( ref_pic_list_reordering_flag_10 ) | | |
|       do { | | |
|         reordering_of_pic_nums_idc | 2 | ue(v) |
|         if( reordering_of_pic_nums_idc == 0 \|\|<br>          reordering_of_pic_nums_idc == 1 ) | | |
|           abs_diff_pic_num_minus1 | 2 | ue(v) |
|         else if( reordering_of_pic_nums_idc == 2 ) | | |
|           long_term_pic_num | 2 | ue(v) |
|       } while( reordering_of_pic_nums_idc != 3 ) | | |
|   } | | |
|   if( slice_type == B \|\| slice_type == EB ) {<br>        /* slice_type EB is specified in Annex Error!<br>Reference source not found. */ | | |
|     ref_pic_list_reordering_flag_11 | 2 | u(1) |
|     if( ref_pic_list_reordering_flag_11 ) | | |
|       do { | | |
|         reordering_of_pic_nums_idc | 2 | ue(v) |
|         if( reordering_of_pic_nums_idc == 0 \|\|<br>          reordering_of_pic_nums_idc == 1 ) | | |
|           abs_diff_pic_num_minus1 | 2 | ue(v) |
|         else if( reordering_of_pic_nums_idc == 2 ) | | |
|           long_term_pic_num | 2 | ue(v) |
|       } while( reordering_of_pic_nums_idc != 3 ) | | |
|   } | | |
| } | | |

FIG. 3

| slice_header_mvc_extension( ) { | C | Descriptor |
|---|---|---|
| first_mb_in_slice | 2 | ue(v) |
| slice_type | 2 | ue(v) |
| pic_parameter_set_id | 2 | ue(v) |
| frame_num | 2 | u(v) |
| if( !frame_mbs_only_flag ) { | | |
| field_pic_flag | 2 | u(1) |
| if( field_pic_flag ) | | |
| bottom_field_flag | 2 | u(1) |
| } | | |
| if( nal_unit_type == 21 ) | | |
| idr_pic_id | 2 | ue(v) |
| if( pic_order_cnt_type == 0 ) { | | |
| pic_order_cnt_lsb | 2 | u(v) |
| if( pic_order_present_flag && !field_pic_flag ) | | |
| delta_pic_order_cnt_bottom | 2 | se(v) |
| } | | |
| if( pic_order_cnt_type == 1 && !delta_pic_order_always_zero_flag ) { | | |
| delta_pic_order_cnt [ 0 ] | 2 | se(v) |
| if( pic_order_present_flag && !field_pic_flag ) | | |
| delta_pic_order_cnt [ 1 ] | 2 | se(v) |
| } | | |
| if( redundant_pic_cnt_present_flag ) | | |
| redundant_pic_cnt | 2 | ue(v) |
| if( slice_type == EB ) | | |
| direct_spatial_mv_pred_flag | 2 | u(1) |
| if( slice_type == EB || slice_type == EB ) { | | |
| num_ref_idx_active_override_flag | 2 | u(1) |
| if( num_ref_idx_active_override_flag ) { | | |
| num_ref_idx_l0_active_minus1 | 2 | ue(v) |
| *num_ref_idx_l0_active_view_minus1* | 2 | *ue(v)* |
| if( slice_type == EB ) { | | |
| num_ref_idx_l1_active_minus1 | 2 | ue(v) |
| *num_ref_idx_l1_active_view_minus1* | 2 | *ue(v)* |

FIG. 4A

| | | |
|---|---|---|
| } | | |
| } | | |
| } | | |
| ref_pic_list_reordering_mvc_extension( ) | 2 | |
| if( ( weighted_pred_flag && ( slice_type == EP ) ) \|\| <br> ( weighted_bipred_idc == 1 && slice_type == EB ) ) | | |
| pred_weight_table( ) | 2 | |
| if( nal_ref_idc != 0 ) | | |
| dec_ref_pic_marking_mvc_extension ( ) | 2 | |
| if( entropy_coding_mode_flag && slice_type != I && slice_type != SI ) | | |
| cabac_init_idc | 2 | ue(v) |
| slice_qp_delta | 2 | se(v) |
| if( slice_type == SP \|\| slice_type == SI ) { | | |
| if( slice_type == SP ) | | |
| sp_for_switch_flag | 2 | u(1) |
| slice_qs_delta | 2 | se(v) |
| } | | |
| if( deblocking_filter_control_present_flag ) { | | |
| disable_deblocking_filter_idc | 2 | ue(v) |
| if( disable_deblocking_filter_idc != 1 ) { | | |
| slice_alpha_c0_offset_div2 | 2 | se(v) |
| slice_beta_offset_div2 | 2 | se(v) |
| } | | |
| } | | |
| if( num_slice_groups_minus1 > 0 && <br> slice_group_map_type >= 3 && slice_group_map_type <= 5) | | |
| slice_group_change_cycle | 2 | u(v) |
| } | | |

FIG. 4B

| ref_pic_list_reordering_mvc_extension( ) { | C | Descriptor |
|---|---|---|
| if( slice_type != I && slice_type != SI && slice_type != EI ) {<br>    /* slice_type EI is specified in Annex Error! Reference source not found. */ | | |
| mvc_ref_pic_list_reordering_flag_l0 | 2 | u(1) |
| If( mvc_ref_pic_list_reordering_flag_l0 ) | | |
| do { | | |
| difference_of_view_id | 215 | se(v) |
| mvc_reordering_of_pic_nums_idc | 2 | ue(v) |
| if( mvc_reordering_of_pic_nums_idc == 0 ‖<br>  mvc_reordering_of_pic_nums_idc == 1 ) | | |
| abs_diff_pic_num_minus1 | 215 | ue(v) |
| else if( mvc_reordering_of_pic_nums_idc == 2 ) | | |
| long_term_pic_num | 2 | ue(v) |
| } while( mvc_reordering_of_pic_nums_idc != 3 ) | | |
| } | | |
| if( slice_type == B ‖ slice_type == EB ) {<br>    /* slice_type EB is specified in Annex Error! Reference source not found. */ | | |
| mvc_ref_pic_list_reordering_flag_l1 | 2 | u(1) |
| If( mvc_ref_pic_list_reordering_flag_l1 ) | | |
| do { | | |
| difference_of_view_id | 215 | se(v) |
| mvc_reordering_of_pic_nums_idc | 2 | ue(v) |
| if( mvc_reordering_of_pic_nums_idc == 0 ‖<br>  mvc_reordering_of_pic_nums_idc == 1 ) | | |
| abs_diff_pic_num_minus1 | 2 | ue(v) |
| else if( mvc_reordering_of_pic_nums_idc == 2 ) | | |
| long_term_pic_num | 2 | ue(v) |
| } while( mvc_reordering_of_pic_nums_idc != 3 ) | | |
| } | | |
| ref_pic_list_reordering( ) | 2 | |
| } | | |

FIG. 5

| ref_pic_list_reordering_mvc_extention( ) { | C | Descriptor |
|---|---|---|
|   if( slice_type != I && slice_type != SI && slice_type != EI ) { | | |
|     mvc_ref_pic_list_reordering_flag_l0 | 2 | u(1) |
|     If( mvc_ref_pic_list_reordering_flag_l0 ) | | |
|       do { | | |
|         difference_of_view_id | 215 | se(v) |
|         mvc_reordering_of_pic_nums_idc | 2 | ue(v) |
|         if( mvc_reordering_of_pic_nums_idc == 0 \|\| <br>           mvc_reordering_of_pic_nums_idc == 1 ) | | |
|           abs_diff_pic_num_minus1 | 215 | ue(v) |
|         else if( mvc_reordering_of_pic_nums_idc == 2 ) | | |
|           long_term_pic_num | 2 | ue(v) |
|       } while( mvc_reordering_of_pic_nums_idc != 3 ) | | |
|   } | | |
|   if( slice_type == B \|\| slice_type == EB ) { | | |
|     mvc_ref_pic_list_reordering_flag_l1 | 2 | u(1) |
|     If( mvc_ref_pic_list_reordering_flag_l1 ) | | |
|       do { | | |
|         difference_of_view_id | 215 | se(v) |
|         mvc_reordering_of_pic_nums_idc | 2 | ue(v) |
|         if( mvc_reordering_of_pic_nums_idc == 0 \|\| <br>           mvc_reordering_of_pic_nums_idc == 1 ) | | |
|           abs_diff_pic_num_minus1 | 2 | ue(v) |
|         else if( mvc_reordering_of_pic_nums_idc == 2 ) | | |
|           long_term_pic_num | 2 | ue(v) |
|       } while( mvc_reordering_of_pic_nums_idc != 3 ) | | |
|   } | | |
| } | | |

FIG. 6

REFERENCE PICTURE LIST MANAGEMENT SYNTAX FOR MULTIPLE VIEW VIDEO CODING

CROSS-REFERENCE TO RELATED APPLICATIONS

This application is a National Stage Application and claims the benefit, under 35 U.S.C. §365 of International Application PCT/US2007/021842 filed Oct. 12, 2007, which was published in accordance with PCT Article 21(2) on Apr. 24, 2008 in English, and which claims the benefit of U.S. Provisional Patent Application Nos. 60/851,863 and 60/851,521 filed on Oct. 13, 2006.

TECHNICAL FIELD

The present invention relates to the field of moving pictures, especially the issue of the ordering of reference pictures when used to code a video picture.

BACKGROUND

Many interframe encoding systems make use of reference pictures where the use of such reference pictures helps reduce the size of an encoded bit stream. This type of result is encoding efficiency is better than just using intraframe encoding techniques, by themselves. Many encoding standards therefore incorporate both intraframe and interfame encoding techniques to encode a bit stream from a series of moving images. As known in the art, different types of reference pictures are used for encoding standards such as an "I" picture which is encoded only by using elements within the picture itself (intraframe), a "B" picture which is encoded by using elements from within the picture itself and/or elements from two previous reference pictures (interframe), and a "P" picture which is encoded by using elements from within the picture itself and/or elements from one previous reference picture (interframe).

When the "B" or "P" pictures are being encoded and/or decoded, such pictures are therefore dependent on other reference frames so that such pictures may be properly encoded or constructed during a decoding operation. The encoding/decoding system should provide some type of memory location so that reference picture can be stored while other pictures are being encoded or decoded in view of such reference pictures. These types of pictures have a temporal relationship between each other.

This situation becomes more complex when considering a video standard where multiple views between different video pictures are to be considered. For example, FIG. 1 represents an exemplary embodiment of a reference picture structure used in a Multiview Video Coding system. Specifically, the presented structure pertains to the use of eight different views (S0-S7) for times (T0-T100) in accordance with the multiview encoding (MVC) scheme proposed in A. Vetro, Y. Su, H. Kimata, A. Smolic, "Joint Multiview Video Model (JMVM) 1.0", JVT-T208.doc, Klagenfurt, Austria, July, 2006. This multiview encoding standard is based on coding in the Advanced Video Coding (AVC) standard (G. Sullivan, T. Wiegand, A. Luthra, "Draft of Version 4 of H.264/AVC (ITU-T Recommendation H.264 and ISO/IEC 14496-10 (MPEG-4 part 10) Advanced Video Coding)", Palma de Mallorca, ES 18-22, October 2004). The large difference between both standards is AVC does not addresses coding multiview pictures while MVC does.

Referring back to FIG. 1, it can be seen for example that when coding a picture associated with view S1 at T1, that the picture to be coded is related to pictures (reference pictures) from the same view (S1 at T0 and S1 at T2), and that the picture to be coded is related to pictures from pictures from a different view (S0 at T1 and S2 at T1). Hence, when coding the picture associated with S1, T1, it would make sense to keep reference pictures (S1 at T0, S1 at T2, S0 at T1 and S2 at T1) in a memory device such as a buffer, register, RAM, and the like.

A generalized implementation for the operation for a coder and a memory device which stores reference pictures as used in the AVC video standard is shown in FIG. 2. Specifically, in block diagram 200 a coder 205, coding buffer 210, and decoded picture buffer (DPB) 215 are disclosed. During a coding operation (either encoding or decoding), a picture that is currently being coded by coder is present in coding buffer 210, while previously coded reference pictures are stored in decoded picture buffer 215.

A problem results however when having to code a picture which requires the use of more than two reference pictures, when such pictures are stored in DPB 215. That is, DPB 215 has to provide some type of organization to such reference pictures to make them available to coder 205 during the coding operation. It is also to be appreciated that different reference pictures may have to be accessed by a coder 205 via DPB 215 when coding a second picture. In the temporal case (such as AVC), this problem is complex enough, but it becomes the problem of making reference pictures available becomes magnified when having to consider reference pictures from different views (as shown in FIG. 1) when coding a picture in a video standard such as MVC.

SUMMARY

These and other drawbacks and disadvantages of the prior art are addressed by the present principles, which are directed to a method and apparatus for reusing available motion information as a motion estimation predictor for video encoding.

According to an aspect of the present principles, there is provided a coder that performs memory management operations on a reference picture stored in a memory device in view of information from a picture being decoded by the decoder, where such information is related to view information associated with that reference picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 3 presents an embodiment of pseudo code for a syntax element ref_pic_list_reordering( ) used in accordance with the principles of the present invention.

FIG. 5 presents an embodiment of pseudo code for a syntax element ref_pic_list_reordering_mvc_extension( ) used in accordance with the principles of the present invention.

FIG. 6 presents an embodiment of pseudo code for a syntax element ref_pic_list_reordering_mvc_extension( ) used in accordance with the principles of the present invention.

DETAILED DESCRIPTION

The principles of the invention can be applied to any intraframe and interframe based encoding standard. The term "picture" which is used throughout this specification is used as a generic term for describing various forms of video image information which can be known in the art as a "frame", "field", and "slice", as well as the term "picture" itself. It should be noted that although the term picture is being used to represent various elements video information, AVC refers to the use of slices where such reference pictures may use slices from the same picture as a "reference picture", and regardless of how a picture may be sub-divided, the principles of the present invention apply.

Also, in the description of the present invention, various commands (syntax elements) which use the C language type of formatting are detailed in the figures that use the following nomenclature for descriptors in such commands:

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer Exp-Golomb-coded syntax element with the left bit first.

se(v): signed integer Exp-Golomb-coded syntax element with the left bit first.

C: represents the category for which a syntax element applies to, i.e. to what level should a particular field apply.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
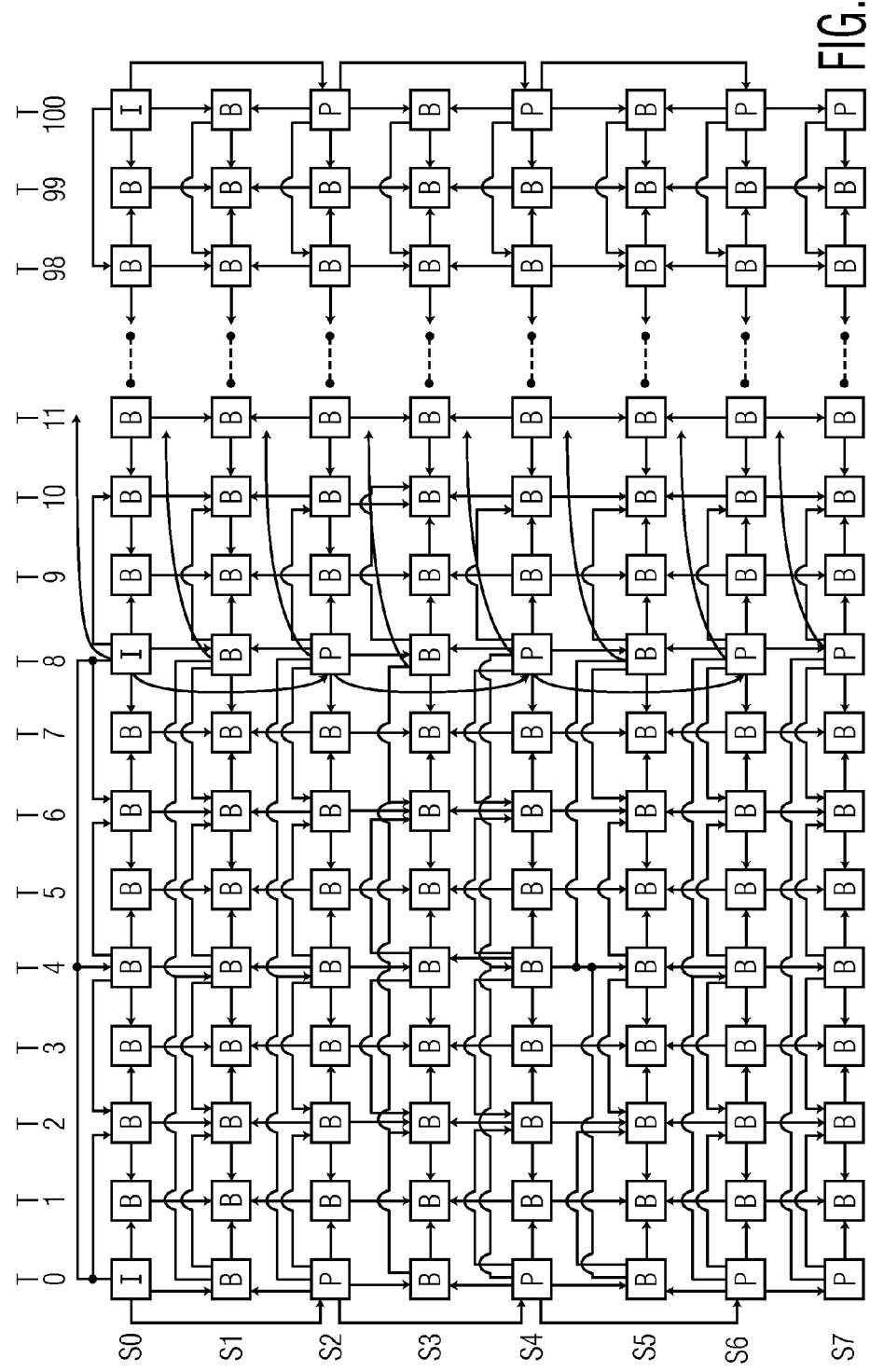
FIG. 1 presents an exemplary embodiment multiview coding of video picture views at different times, where such video pictures are coded using reference pictures in the manner indicated in the figure.
Figure 2:
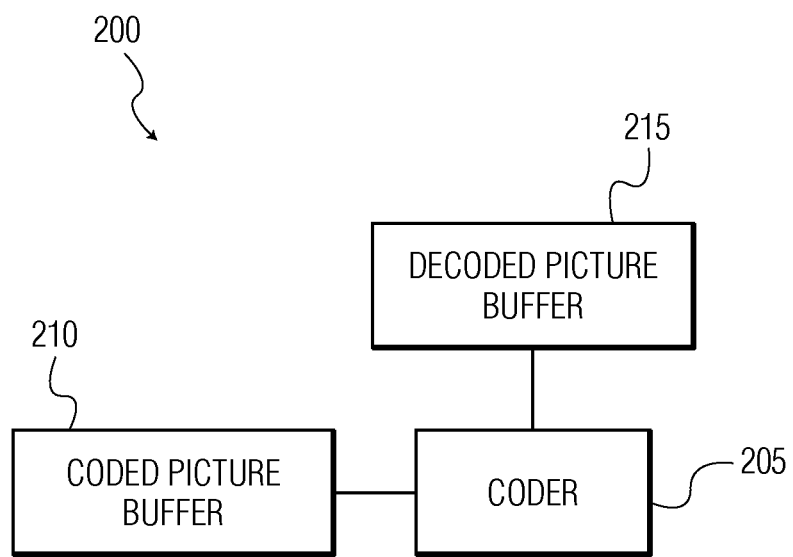
FIG. 2 presents an exemplary embodiment of a video coder in accordance with the principles of the present invention.

Referring back to FIG. 2, when coder 205 (under AVC and MVC) performs an encoding operation where a moving picture is encoded, the encoded picture is associated with several different values, where such values are placed in the picture header (for example, slice header) by coder 205. The first value called a pic_num (picture number) indicates the order of the picture, as coded, in a sequence of coded video pictures. For example, the first picture in the sequence would have a value of "1" while the fourth picture that is coded would have a value of "4".

A picture would also have a value called picture order count (POC) which determines the order in which a coded picture is to be displayed when it is finally decoded. This means, that it is possible for a coded picture to have a frame num which is different than the POC number associated with the picture.

Multi-view video coding introduces a third value which may be used in conjunction for a picture. A view_id (view id) value indicates the view to which a picture corresponds. For example, a picture is associated with a view S3 has a view_id equal to "3", while picture corresponding to view S5 has a view_id equal to "5". The view_id number is also helpful because the usage of such a value allows the coder to decouple the pic_num and POC between different views, which provides a DPB 215 to store reference pictures with the same pic_num and/or POC. Such pictures (with the same POC or pic_num) therefore are distinguished between from each other by using the view_id value.

It should be appreciated that the values described above may be implemented in different ways (using other numbers, variable names, hash tables, and the like).

When storing references pictures in the DPB 215 (as explained in "Frame and Picture Management" by Iain G Richardson located at http://www.rgu.ac.uk/files/avc_picmanagement_draft1.pdf), such pictures are assigned a memory status which marks a reference picture as a short term reference picture (which is reference either by PicNum or PicOrderCount) or a long term reference picture (which is reference by a LongTermPicNum representing a number in the LongTermPic index). It is to be understood that the status of a reference picture may be changed (by the use for example of a memory management command operator, as known in AVC) between long term, short term, or even to a status known as "not a reference" where the reference picture will eventually be removed from the DPB 215.

The organization of reference pictures are ordered into either one or two lists, which are used before coding a picture (slice). The reference for a P picture will use a single list of pictures (list0) while a B picture will use two lists (list0 and list1). The default organization of a picture in a picture list depends on the decoding order (PicNum) when a current picture being coded is a P picture and on the display order when a current picture being coded is a B picture. Reference pictures designated as long term reference pictures are typically assigned a LongTermPicNum and are placed in the reference list in a position, so that the picture will be retained for a longer time than a short term picture.

AVC allows a coder 205 to change the default order of reference pictures in list0 (and list1 for B pictures (slices)) when coding a picture slice. That is, the coder may recognize that one reference picture (in the list) may be a better reference picture than indicated in the reference list. This also helps with coding efficiency by making reference pictures, more correlated to a current picture to be coded, occupy a position on the reference list which is lower in the indicies (closer to) than a reference picture which is less related to a picture to be coded. Hence, commands known as Reference Picture List Reordering commands (RPLR) are used to move around the order of such reference pictures and are shown in FIG. 3

FIG. 3 shows the AVC syntax element as ref_pic_list_reordering (which are described in relation to slices, although it is to be appreciated that such concepts can be performed for pictures, as explained above) provides the AVC commands used for reordering a picture list, where their meaning are explained with the AVC reference.

When considering the use of reference picture lists within the context of MVC, there will actually be two sets of references to consider where there are temporal references and the cross-view references, as opposed to AVC which only considers temporal references.

Hence, it has been proposed in the prior art in the principles as disclosed in K. Muller, P. Merkle, A. Smolic, T. Wiegand, "Multiview Coding using AVC", m12945, Bangkok, Thailand, January 2006, to construct an single interleaved sequence which will interleave all video sequences into a single sequence, which can then be coded by an AVC capable coder and produce a compatible bit stream. Once again though, the downside to this proposed AVC implementation is that there is no way to identify which view any picture belong since unique values for pic_num and POC have to be assigned to each picture that is coded in order to implement the RPLP commands as they currently exist in AVC.

Back to the current implementation of MVC, it has been proposed to incorporate an additional syntax which is added to the Sequence Parameter Set (SPS) to signal cross view references. This syntax element, as shown below, is used to indicate the cross-view references to be used for anchor and non-anchor pictures.

The following procedure shall be conducted to place reference pictures from a view that is different from the current view into the reference prediction lists:

For each value of i from 0 to num_multiview_ref_for_listX−1:
The reconstructed picture from view reference_view_for_list_X[i] that is temporally aligned with the current picture shall be obtained and inserted into the decoded prediction buffer (DPB).
An index to that picture shall be inserted into the next empty slot in RefPicListX.

This implementation however has a problem in that there is a fixed way of initializing (and constructing) a reference picture list, which cannot be changed. That is, there is no flexibility in the order of the temporal and cross-view pictures. Additionally, the number of reference pictures designated for each anchor (I) and non-anchor picture (B and P) are the same.

The present invention therefore proposes a framework for how to reorder a reference picture list that considers multiview pictures. It is to be understood that although the embodiments of the present invention are disclosed within the context of the AVC and MVC environments, it is to be understood that the principles of the present invention apply to other video coding standards, as well.

Figure 4:
FIG. 4 presents an embodiment of pseudo code for a syntax element slice_shead_mvc_extension( ) used in accordance with the principles of the present invention.

The present invention proposes a new element syntax ref_pic_list_reordering_mvc_extension( ) in FIG. 4 as present in a picture header (slice header).

First, the present invention proposes that the AVC compatible syntax elements num_ref_idx_l0_active_minus1 and num_ref_idx_l1_active_minus1 should be redefined to reflect the fact that they only indicate the number active reference pictures in the temporal sense:

num_ref_idx_l0_active_minus1 specifies the maximum reference index for temporal reference picture list 0 that shall be used to decode the slice. The range of num_ref_idx_l0_active_minus1 is specified as follows.
If field_pic_flag is equal to 0, num_ref_idx_l0_active_minus1 shall be in the range of 0 to 15, inclusive. When MbaffFrameFlag is equal to 1, num_ref_idx_l0_active_minus1 is the maximum index value for the decoding of frame macroblocks and 2*num_ref_idx_l0_active_minus1+1 is the maximum index value for the decoding of field macroblocks.
Otherwise (field_pic_flag is equal to 1), num_ref_idx_l0_active_minus1 shall be in the range of 0 to 31, inclusive.
num_ref_idx_l1_active_minus1 has the same semantics as num_ref_idx_l0_active_minus1 with l0 and list 0 replaced by l1 and list 1, respectively.

Secondly, two new syntax elements are proposed which indicate the number of active reference pictures which are to be in a cross-view sense:

num_ref_idx_l0_active_view_minus1 specifies the maximum reference index for cross-view reference picture list 0 that shall be used to decode the slice. The range of num_ref_idx_l0_active_view_minus1 is specified as follows.
If field_pic_flag is equal to 0, num_ref_idx_l0_active_view_minus1 shall be in the range of 0 to 15, inclusive. When MbaffFrameFlag is equal to 1, num_ref_idx_l0_active_view_minus1 is the maximum index value for the decoding of frame macroblocks and 2*num_ref_idx_l0_active_view_minus1+1 is the maximum index value for the decoding of field macroblocks.
Otherwise (field_pic_flag is equal to 1), num_ref_idx_l0_active_view_minus1 shall be in the range of 0 to 31, inclusive.
num_ref_idx_l1_active_view_minus1 (the other proposed syntax element) has the same semantics as num_ref_idx_l0_active_view_minus1 with l0 and list 0 replaced by l1 and list 1, respectively.

These two syntaxes have values such that they satisfy the following equations:

$$\text{num\_ref\_idx\_}l0\text{\_active\_minus1} + \text{num\_ref\_idx\_}l0\text{\_active\_view\_minus1} <= \text{num\_ref\_frames}$$

and $$\text{num\_ref\_idx\_}l1\text{\_active\_minus1} + \text{num\_ref\_idx\_}l1\text{\_active\_view\_minus1} <= \text{num\_ref\_frames}.$$

As described previously, the default initialization process for a MVC system needs to be defined. Hence, several different embodiments are proposed for such a process:

A first embodiment of the principles of the present invention has all of the temporal pictures of the current view being initialized as defined in the MPEG4 AVC specification. This initialized list is then truncated by the value specified in num_ref_idx_l0_active_minus1 and num_ref_idx_l1_active_minus1 for LIST_0 and LIST_1 respectively.

Following these pictures, the cross-view reference pictures specified in the SPS of the MVC specification are inserted and truncated by the value specified in num_ref_idx_l0_active_view_minus1 and num_ref_idx_l1_active_view_minus1 for LIST_0 and LIST_1 respectively.

In order to allow for the Reference picture list reordering commands as specified in the current MVC specification to function correctly we impose a restriction that these commands can only work on the temporal reference pictures. The RPLR process can either follow immediately after the initialization of the temporal pictures and before the initialization of the cross-view references or can follow after both temporal and cross-view references have been initialized to their default positions, and in the later case only temporal reference pictures will be reordered.

One drawback to this first proposed embodiment is that cross view reference pictures cannot be reordered.

A second embodiment is proposed where the cross-view reference pictures specified in the SPS of the MVC specification are inserted and truncated by the value specified in num_ref_idx_l0_active_view_minus1 and num_ref_idx_l1_active_view_minus1 for LIST_0 and LIST_1 respectively.

Following these pictures, all the temporal pictures of the current view are initialized as defined in the MPEG-4 AVC specification. This is list then truncated by the value specified in num_ref_idx_l0_active_minus1 and num_ref_idx_l1_active_minus1 for LIST_0 and LIST_1 respectively.

A third embodiment is proposed to address the problem with the first embodiment described above. Specifically, referring to PCT Application filed on Oct. 12, 2007 [serial number to be determined] which claims priority from U.S. Provisional Application Ser. No. 60/851,522, filed Oct. 13, 2006, and U.S. Provisional Application Ser. No. 60/851,589, filed on Oct. 13, 2006, the syntax element long_term_frame_idx is used to assign a long-term index (value) to a picture with a view_id that is different than the view associated with a picture currently being coded. By assigning a long term index to cross-view pictures, such pictures then can be treated as if they were being used as AVC pictures which would allow the usage of RPLR commands as applied to long term pictures. Hence, cross-view pictures can be effectively reordered using AVC.

A fourth embodiment is also proposed where new RPLP commands are proposed. These commands are similar to the memory management commands operation that are used to control a DPB 215, but these new commands used to operate on pictures in views other than a view associated with a picture currently being operated on. These new syntax elements are presented in FIG. 5 which shows the proposed MVC reference picture list reordering syntax.

The default initialization for this embodiment can be to first place all the temporal reference as specified in reference list initialization as defined in the H.264/MPEG-4 AVC specification and then follow these pictures with the cross-view pictures are specified in the SPS of the MVC extension of H.264/MPEG4 AVC.

Part of the operation of this embodiment is that the syntax elements are separated between the ref_pic_list_reordering_mvc_extension, may have syntax element ref_pic_list_reordering called. That is the organization of the call can have multiview based pictures processed in the MVC environment and then the results of such a process can have the multiview reference based pictures processed in the AVC environment.

The various states used in conjunction with the indice mvc_reordering_of_pic_nums_idc is disclosed in TABLE 1 below.

TABLE 1

| mvc_reordering_of_pic_nums_idc | Reordering specified |
|---|---|
| 0 | abs_diff_pic_num_minus1 is present and corresponds to a difference to subtract from a picture number prediction value |
| 1 | abs_diff_pic_num_minus1 is present and corresponds to a difference to add to a picture number prediction value |
| 2 | long_term_pic_num is present and specifies the long-term picture number for a reference picture |
| 3 | End loop for reordering of the initial reference picture list |

In addition, the syntax elements mvc_reordering_of_pic_nums_idc, abs_diff_pic_num_minus1, and long_term_pic_num specify the change from the initial reference picture lists to the reference picture lists to be used for decoding the slice.

mvc_ref_pic_list_reordering_flag_l0 equal to 1 specifies that the syntax element mvc_reordering_of_pic_nums_idc is present for specifying reference picture list 0. mvc_ref_pic_list_reordering_flag_l0 equal to 0 specifies that this syntax element is not present.

When mvc_ref_pic_list_reordering_flag_l0 is equal to 1, the number of times that mvc_reordering_of_pic_nums_idc is not equal to 3 following mvc_ref_pic_list_reordering_flag_l0 shall not exceed num_ref_idx_l0_active_minus1+1.

When RefPicList0[num_ref_idx_l0_active_minus1] in the initial reference picture list produced as specified in H.264/MPEG-4 AVC specification is equal to "no reference picture", mvc_ref_pic_list_reordering_flag_l0 shall be equal to 1 and mvc_reordering_of_pic_nums_idc shall not be equal to 3 until RefPicList0[num_ref_idx_l0_active_minus1] in the reordered list produced as specified in H.264/MPEG-4 AVC specification is not equal to "no reference picture".

mvc_ref_pic_list_reordering_flag_l1 equal to 1 specifies that the syntax element mvc_reordering_of_pic_nums_idc is present for specifying reference picture list 1. mvc_ref_pic_list_reordering_flag_l1 equal to 0 specifies that this syntax element is not present.

When mvc_ref_pic_list_reordering_flag_l1 is equal to 1, the number of times that mvc_reordering_of_pic_nums_idc is not equal to 3 following mvc_ref_pic_list_reordering_flag_l1 shall not exceed num_ref_idx_l1_active_minus1+1. When decoding a B slice and RefPicList1[num_ref_idx_l1_active_minus1] in the initial reference picture list produced as specified in H.264/MPEG4 AVC specification is equal to "no reference picture", mvc_ref_pic_list_reordering_flag_l1 shall be equal to 1 and mvc_reordering_of_pic_nums_idc shall not be equal to 3 until RefPicList1[num_ref_idx_l1_active_minus1] in the reordered list produced as specified in H.264/MPEG-4 AVC specification is not equal to "no reference picture".

mvc_reordering_of_pic_nums_idc together with difference_of_view_id and abs_diff_pic_num_minus1 or long_term_pic_num specifies which of the reference pictures are re-mapped. The values of mvc_reordering_of_pic_nums_idc are specified in H.264/MPEG4 AVC specification. The value of the first mvc_reordering_of_pic_nums_idc that follows immediately after mvc_ref_pic_list_reordering_flag_l0 or mvc_ref_pic_list_reordering_flag_l1 shall not be equal to 3.

abs_diff_pic_num_minus1 plus 1 specifies the absolute difference between the picture number of the picture being moved to the current index in the list and the picture number prediction value. abs_diff_pic_num_minus1 shall be in the range of 0 to MaxPicNum−1. The picture being moved must have a view_id that is different from the view_id of the current picture.

long_term_pic_num specifies the long-term picture number of the picture being moved to the current index in the list. When decoding a coded frame, long_term_pic_num shall be equal to a LongTermPicNum assigned to one of the reference frames or complementary reference field pairs marked as "used for long-term reference". When decoding a coded field, long_term_pic_num shall be equal to a LongTermPicNum assigned to one of the reference fields marked as "used for long-term reference". The picture being moved must have a view_id that is different from the view_id of the current picture.

difference_of_view_id specifies the difference between the view_id of the picture being moved to the current index in the list and the view_id prediction value.

The process to perform reordering of the reference pictures is based on the default list and can be described as follows:

When mvc_ref_pic_list_reordering_flag_I0 is equal to 1, the following applies.

Let refIdxL0 be an index into the reference picture list RefPicList0. It is initially set equal to 0.

The corresponding syntax elements mvc_reordering_of_pic_nums_idc are processed in the order they occur in the bitstream. For each of these syntax elements, the following applies.

1) If mvc_reordering_pic_nums_idc is equal to 0 or equal to 1, the process specified in I below is invoked with refIdxL0 as input, and the output is assigned to refIdxL0.
2) Otherwise, if mvc_reordering_of_pic_nums_idc is equal to 2, the process specified in II below is invoked with refIdxL0 as input, and the output is assigned to refIdxL0.
3) Otherwise (mvc_reordering_of_pic_nums_idc is equal to 3), the reordering process for reference picture list RefPicList0 is finished.

When mvc_ref_pic_list_reordering_flag_I1 is equal to 1, the following applies.

Let refIdxL1 be an index into the reference picture list RefPicList1. It is initially set equal to 0.

The corresponding syntax elements mvc_reordering_of_pic_nums_idc are processed in the order they occur in the bitstream. For each of these syntax elements, the following applies.

4) If mvc_reordering_of_pic_nums_idc is equal to 0 or equal to 1, the process specified in I below is invoked with refIdxL1 as input, and the output is assigned to refIdxL1.
5) Otherwise, if mvc_reordering_of_pic_nums_idc is equal to 2, the process specified in II below is invoked with refIdxL1 as input, and the output is assigned to refIdxL1.
6) Otherwise (mvc_reordering_of_pic_nums_idc is equal to 3), the reordering process for reference picture list RefPicList1 is finished.

The following is proposed for reordering reference picture lists for short-term reference pictures with a view_id which is different than the view_id of a picture currently being coded:

Input to this process is an index refIdxLX (with X being 0 or 1).

Output of this process is an incremented index refIdxLX.

viewIdLX=viewidLXPred+difference_of_view_id

The variable picNumLXNoWrap is derived as follows:

```
If mvc_reordering_of_pic_nums_idc is equal to 0
    if( picNumLXPred − ( abs_diff_pic_num_minus1 + 1 ) < 0 )
        picNumLXNoWrap = picNumLXPred −
        ( abs_diff_pic_num_minus1 + 1 ) + MaxPicNum
    else
        picNumLXNoWrap = picNumLXPred −
        ( abs_diff_pic_num_minus1 + 1 )
Otherwise (mvc_reordering_of_pic_nums_idc is equal to 1),
    if( picNumLXPred + ( abs_diff_pic_num_minus1 + 1 ) >=
    MaxPicNum )
        picNumLXNoWrap = picNumLXPred +
        ( abs_diff_pic_num_minus1 + 1 ) MaxPicNum
    else
        picNumLXNoWrap = picNumLXPred +
        ( abs_diff_pic_num_minus1 + 1 ).
``` viewIdLXPred is the prediction value for the variable viewIdLX. When the process specified in this subclause is invoked the first time for a slice (that is, for the first occurrence of mvc_reordering_of_pic_nums_idc equal to 0 or 1 in the ref_pic_list_reordering( ) syntax), viewIdL0Pred and viewIdL1Pred are initially set equal to CurrViewId. After each assignment of viewIdLx, the value of viewIdLX is assigned to viewIdLXPred.

picNumLXPred is the prediction value for the variable picNumLXNoWrap. When the process specified in this subclause is invoked the first time for a slice (that is, for the first occurrence of mvc_reordering_of_pic_nums_idc equal to 0 or 1 in the ref_pic_list_reordering( ) syntax), picNumL0Pred and picNumL1Pred are initially set equal to CurrPicNum. After each assignment of picNumLXNoWrap, the value of picNumLXNoWrap is assigned to picNumLXPred.

The variable picNumLX is derived as follows:

```
if( picNumLXNoWrap > CurrPicNum )
    picNumLX = picNumLXNoWrap − MaxPicNum
else
    picNumLX = picNumLXNoWrap
``` picNumLX and viewIdLX shall be equal to the PicNum and viewId of a reference picture that is marked as "used for short-term reference" and shall not be equal to the PicNum of a short-term reference picture that is marked as "non-existing".

The following procedure is conducted to place the picture with short-term picture number picNumLX with view_id equal to viewIdLX into the index position refIdxLX, shift the position of any other remaining pictures to later in the list, and increment the value of refIdxLX.

```
for( cIdx = num_ref_idx_IX_active_minus1 + 1;
cIdx > refIdxLX; cIdx−− )
    RefPicListX[ cIdx ] = RefPicListX[ cIdx − 1]
RefPicListX[ refIdxLX++ ] = short-term reference picture with
PicNum equal to picNumLX and view_id equal to viewIdLX
nIdx = refIdxLX
for( cIdx = refIdxLX; cIdx <= num_ref_idx_IX_active_minus1 + 1;
cIdx++ )
    if( ( PicNumF( RefPicListX[ cIdx ] ) != picNumLX ) &&
ViewIdF(RefPicListX[cIdx ]) != viewIdLX)
        RefPicListX[ nIdx++ ] =
        RefPicListX[ cIdx ]
``` where the function PicNumF(RefPicListX[cIdx]) is derived as follows:

If the picture RefPicListX[cIdx] is marked as "used for short-term reference", PicNumF(RefPicListX[cIdx]) is the PicNum of the picture RefPicListX[cIdx].

Otherwise (the picture RefPicListX[cIdx] is not marked as "used for short-term reference"), PicNumF(RefPicListX[cIdx]) is equal to MaxPicNum.

It is noted that the value of MaxPicNum can never be equal to picNumLX.

where the function ViewIdF(RefPicListX[cIdx]) is derived as follows:

ViewIdF(RefPicListX[cIdx]) is the viewId of the picture RefPicList([cIdx].

Also note, within this pseudo-code procedure, the length of the list RefPicListX is temporarily made one element longer than the length needed for the final list. After the execution of this procedure, only elements 0 through num_ref_idx_IX-active_minus1 of the list need to be retained.

For the reordering of reference picture lists contained long-term reference pictures, the following is proposed:

Input to this process is an index refIdxLX (with X being 0 or 1).

Output of this process is an incremented index refIdxLX.

The following procedure is conducted to place the picture with long-term picture number long_term_pic_num that is present in view indicated by viewIdX as derived above into the index position refIdxLX, shift the position of any other remaining pictures to later in the list, and increment the value of refIdxLX.

```
for( cIdx = num_ref_idx_IX_active_minus1 + 1;
cIdx > refIdxLX; cIdx-- )
    RefPicListX[ cIdx ] = RefPicListX[ cIdx - 1]
RefPicListX[ refIdxLX++ ] = long-term reference picture with
LongTermPicNum equal to long_term_pic_num and viewId equal to
viewIdLX nIdx = refIdxLX
for( cIdx = refIdxLX; cIdx <= num_ref_idx_IX_active_minus1 + 1;
cIdx++ )
    if( (LongTermPicNumF( RefPicListX[ cIdx ] ) !=
long_term_pic_num ) && ViewIdF(RefPicListX[ cIdx ] ]) !=
viewIdLX)
        RefPicListX[ nIdx++ ] = RefPicListX[ cIdx ]
``` where the function LongTermPicNumF(RefPicListX[cIdx]) is derived as follows:

If the picture RefPicListX[ cIdx ] is marked as "used for long-term reference", LongTermPicNumF( RefPicListX[ cIdx ] ) is the LongTermPicNum of the picture RefPicListX[ cIdx ].
Otherwise (the picture RefPicListX[ cIdx ] is not marked as "used for long-term reference"), LongTermPicNumF( RefPicListX[ cIdx ] ) is equal to 2 * ( MaxLongTermFrameIdx + 1 ).
    It is noted that value of 2 * ( MaxLongTermFrameIdx + 1 ) can never be equal to long_term_pic_num.

where the function ViewIdF(RefPicListX[cIdx]) is derived as follows:

If the picture RefPicListX[cIdx] is marked as "used for short-term reference", ViewIdF(RefPicListX[cIdx]) is the viewId of the picture RefPicListX[cIdx].

Otherwise (the picture RefPicList([cIdx] is not marked as "used for short-term reference"), PicNumF(RefPicListX[cIdx]) is equal to MaxPicNum.

It is also noted that the value of MaxPicNum can never be equal to picNumLX. and within this pseudo-code procedure, the length of the list RefPicListX is temporarily made one element longer than the length needed for the final list. After the execution of this procedure, only elements 0 through num_ref_idx_IX_active_minus1 of the list need to be retained.

An additional framework for the principles of the present invention are disclosed and described below for the syntax element ref_pic_reordering_mvc_extension( ) shown in FIG. 6. One difference between the operation of this syntax element verses the syntax element described in regard to FIG. 5, is that the reordering lists may be done for any view and that such reordering is done by using only one call instead of having to call on separate rec_pic_list_reordering command (as shown in FIG. 3).

For a first embodiment under this alternative framework, the variables num_ref_idx_I0_active_minus1 and num_ref_Idx_I1_active_minus1 are redefined again to represent the number of active reference pictures in the temporal sense (see the previous sections describing these variables). This embodiment defines the variables num_ref_idx_I0_active_view and num_ref_idx_I1_active_view which are used to indicate the number of active pictures in a cross view:

num_ref_idx_I0_active_view specifies the maximum reference index for cross-view reference picture list 0 that shall be used to decode the slice. The range of num_ref_idx_I0_active is specified as follows.

If field_pic_flag is equal to 0, num_ref_idx_I0_active_view shall be in the range of 0 to 16, inclusive. When MbaffFrameFlag is equal to 1, num_ref_idx_I0_active_view is the maximum index value for the decoding of frame macroblocks and 2*num_ref_idx_I0_active_view is the maximum index value for the decoding of field macroblocks.

Otherwise (field_pic_flag is equal to 1), num_ref_idx_I0_active_view shall be in the range of 0 to 32, inclusive.

num_ref_idx_I1_active_view has the same semantics as num_ref_idx_I0_active_view with 10 and list 0 replaced by I1 and list 1, respectively.

These syntaxes have values such that they satisfy the following equation:

$$num\_ref\_idx\_I0\_active\_minus1 + num\_ref\_idx\_I0\_active\_view <= num\_ref\_frames$$

and $$num\_ref\_idx\_I1\_active\_minus1 + num\_ref\_idx\_I1\_active\_view <= num\_ref\_frames.$$

As mentioned before, the default initialization process for MVC system needs to be clearly defined.

First, all the temporal pictures of the current view are initialized as defined in the MPEG4 AVC specification. This includes short term and long term references. This list is then truncated by the value specified in num_ref_idx_I0_active_minus1 and num_ref_idx_I1_active_minus1 for LIST_0 and LIST_1 respectively.

Following these pictures the cross-view reference pictures specified in the SPS of the MVC specification are inserted and truncated by the value specified in num_ref_idx_I0_active_view and num_ref_idx_I1_active_view for LIST_0 and LIST_1 respectively.

New RPLR commands which are similar to the existing H.264/MPEG4 AVC RPLR commands are introduced. These commands replace the existing RPLR commands in H.264/MPEG4 AVC (see FIG. 6)

The new RPLR commands have the following semantics. The command to indicate if reordering commands are present or not is shown in TABLE 1 above.

The syntax elements mvc_reordering_of_pic_nums_idc, abs_diff_pic_num_minus1, and long_term_pic_num specify the change from the initial reference picture lists to the reference picture lists to be used for decoding the picture information (such as a slice).

mvc_ref_pic_list_reordering_flag_I0 equal to 1 specifies that the syntax element mvc_reordering_of_pic_nums_idc is present for specifying reference picture list 0. mvc_ref_pic_list_reordering_flag_I0 equal to 0 specifies that this syntax element is not present.

When the mvc_ref_pic_list_reordering_flag_I0 is equal to 1, the number of times that mvc_reordering_of_pic_nums_idc is not equal to 3 following mvc_ref_pic_list_reordering_flag_I0 shall not exceed num_ref_idx_I0_active_minus1+I+num_ref_idx_I0_active_view.

When RefPicList0[num_ref_idx_I0_active_minus1+num_ref_idx_I0_active_view] in the initial reference picture list produced as specified in H.264/MPEG4 AVC specification is equal to "no reference picture", mvc_ref_pic_list_reordering_flag_I0 shall be equal to 1 and mvc_reordering_of_pic_nums_idc shall not be equal to 3 until RefPicList0 [num_ref_idx_I0_active_minus1+num_ref_idx_I0_active_view] in the reordered list produced as specified in H.264/MPEG-4 AVC specification is not equal to "no reference picture".

mvc_ref_pic_list-roordering_flag_I0 equal to 1 specifies that the syntax element mvc_reordering_of_pic_nums_idc is present for specifying reference picture list 1.

mvc_ref_pic_list_reordering_flag_I1 equal to 0 specifies that this syntax element is not present.

When mvc_ref_pic_list_reordering_flag_I1 is equal to 1, the number of times that mvc_reordering_of_pic_nums_idc is not equal to 3 following mvc_ref_pic_list_reordering_flag_I1 shall not exceed num_ref_idx_I1_active_minus1+1+num_ref_idx_I1_active_view.

When decoding a B slice and RefPicList1[num_ref_idx_µl_active_minus1+num_ref_idx_I1_active_view] in the initial reference picture list produced as specified in H.264/MPEG-4 AVC specification is equal to "no reference picture", mvc_ref_pic_list_reordering_flag_I1 shall be equal to 1 and mvc_reordering_of pic_nums_idc shall not be equal to 3 until RefPicList1[num_ref_idx_I1-active_minus1+num_ref_idx_I1_active_view] in the reordered list produced as specified in H.264/MPEG-4 AVC specification is not equal to "no reference picture".

mvc_reordering_of_pic_nums_idc together with difference_of_view_id and abs_diff_pic_num_minus1 or long_term_pic_num specifies which of the reference pictures are re-mapped. The values of mvc_reordering_of_pic_nums_idc are specified in H.264/MPEG-4 AVC specification. The value of the first mvc_reordering_of_pic_nums_idc that follows immediately after mvc_ref_pic_list_reordering_flag_I0 or mvc_ref_pic_list_reordering_flag_I1 shall not be equal to 3.

abs_diff_pic_num_minus1 plus 1 specifies the absolute difference between the picture number of the picture being moved to the current index in the list and the picture number prediction value. abs_diff_pic_num_minus1 shall be in the range of 0 to MaxPicNum−1.

long_term_pic_num specifies the long-term picture number of the picture being moved to the current index in the list. When decoding a coded frame, long_term_pic_num shall be equal to a LongTermPicNum assigned to one of the reference frames or complementary reference field pairs marked as "used for long-term reference". When decoding a coded field, long_term_pic_num shall be equal to a LongTermPicNum assigned to one of the reference fields marked as "used for long-term reference".

difference_of_view-Id specifies the difference between the view_id of the picture being moved to the current index in the list and the view_id prediction value.

The process to perform reordering of the reference pictures is based on the default list and can be described as follows:
When mvc_ref_pic_list_reordering_flag_I0 is equal to 1, the following applies.
   Let refIdxL0 be an index into the reference picture list RefPicList0. It is initially set equal to 0.
   The corresponding syntax elements. mvc_reordering_of_pic_nums_idc are processed in the order they occur in the bitstream. For each of these syntax elements, the following applies.
     1) If mvc_reordering_of_pic_nums_idc is equal to 0 or equal to 1, the process specified in I below is invoked with refIdxL0 as input, and the output is assigned to refIdxL0.
     2) Otherwise, if mvc_reordering_of_pic_nums_idc is equal to 2, the process specified in II below is invoked with refIdxL0 as input, and the output is assigned to refIdxL0.
     3) Otherwise (mvc_reordering_of_pic_nums_idc is equal to 3), the reordering process for reference picture list RefPicList0 is finished.

When mvc_ref_pic_list_reordering_flag_I1 is equal to 1, the following applies.
   Let refIdxL1 be an index into the reference picture list RefPicList1. It is initially set equal to 0.
   The corresponding syntax elements mvc_reordering_of_pic_nums_idc are processed in the order they occur in the bitstream. For each of these syntax elements, the following applies.
     4) If mvc_reordering_of_pic_nums_idc is equal to 0 or equal to 1, the process specified in I below is invoked with refIdxL1 as input, and the output is assigned to refIdxL1.
     5) Otherwise, if mvc_reordering_of_pic_nums_idc is equal to 2, the process specified in II below is invoked with refIdxL1 as input, and the output is assigned to refIdxL1.
     6) Otherwise (mvc_reordering_of_pic_nums_idc is equal to 3), the reordering process for reference picture list RefPicList1 is finished.

A scheme for reordering reference picture lists for short-term reference pictures is described below:

```
Input to this process is an index refIdxLX (with X being 0 or 1).
Output of this process is an incremented index refIdxLX.
viewIdLX = viewIdLXPred + difference_of_view_id
picNumLXNoWrap is derived as follows.
  If mvc_reordering_of_pic_nums_idc is equal to 0
  if( picNumLXPred − ( abs_diff_pic_num_minus1 + 1 ) < 0 )
      picNumLXNoWrap = picNumLXPred −
  ( abs_diff_pic_num_minus1 + 1 ) + MaxPicNum
  else
      picNumLXNoWrap = picNumLXPred −
      ( abs_diff_pic_num_minus1 + 1 )
  Otherwise (mvc_reordering_of_pic_nums_idc is equal to 1),
  if( picNumLXPred + ( abs_diff_pic_num_minus1 + 1 ) >=
  MaxPicNum )
      picNumLXNoWrap = picNumLXPred +
  ( abs_diff_pic_num_minus1 + 1 ) − MaxPicNum
  else
      picNumLXNoWrap = picNumLXPred +
      ( abs_diff_pic_num_minus1 + 1 )
``` viewIdLXPred is the prediction value for the variable viewIdLX. When the process specified in this subclause is invoked the first time for a slice (that is, for the first occurrence of mvc_reordering_of pic_nums_idc equal to 0 or 1 in the ref_pic_list_reordering( ) syntax), viewIdL0Pred and viewIdL1 Pred are initially set equal to CurrViewId. After each assignment of viewIdLx, the value of viewIdLX is assigned to viewIdLXPred.

picNumLXPred is the prediction value for the variable picNumLXNoWrap. When the process specified in this subclause is invoked the first time for a slice (that is, for the first occurrence of mvc_reordering_of pic_nums_idc equal to 0 or 1 in the ref_pic_list_reordering( ) syntax), picNumL0Pred and picNumL1 Pred are initially set equal to CurrPicNum. After each assignment of picNumLXNoWrap, the value of picNumLXNoWrap is assigned to picNumLXPred.

```
picNumLX is derived as follows
  if( picNumLXNoWrap > CurrPicNum )
      picNumLX = picNumLXNoWrap − MaxPicNum
```

```
    else
        picNumLX = picNumLXNoWrap
``` picNumLX and viewIdLX shall be equal to the PicNum and viewId of a reference picture that is marked as "used for short-term reference" and shall not be equal to the PicNum of a short-term reference picture that is marked as "non-existing".

The following procedure is conducted to place the picture with short-term picture number picNumLX with view_id equal to viewIdLX into the index position refIdxLX, shift the position of any other remaining pictures to later in the list, and increment the value of refIdxLX.

```
for( cIdx = num_ref_idx_IX_active_minus1 + 1;
cIdx > refIdxLX; cIdx-- )
    RefPicListX[ cIdx ] = RefPicListX[ cIdx - 1 ]
RefPicListX[ refIdxLX++ ] = short-term reference picture with PicNum
equal to picNumLX and view_id equal to viewIdLX
nIdx = refIdxLX
for( cIdx = refIdxLX; cIdx <= num_ref_idx_IX_active_minus1 + 1;
cIdx++ )
    if( (PicNumF( RefPicListX[ cIdx ] ) != picNumLX ) &&
ViewIdF(RefPicListX[ cIdx]) != viewIdLX)
        RefPicListX[ nIdx++ ] = RefPicListX[ cIdx ]
```

The function PicNumF(RefPicListX[cIdx]) is derived as follows:
If the picture RefPicListX[cIdx] is marked as "used for short-term reference", PicNumF(RefPicListX[cIdx]) is the PicNum of the picture RefPicLisX([cIdx].
Otherwise (the picture RefPicList([cIdx] is not marked as "used for short-term reference"), PicNumF(RefPicListX [cIdx]) is equal to MaxPicNum.
Note a value of MaxPicNum can never be equal to picNumLX.

The function ViewIdF(RefPicListX[cIdx]) is derived as follows:
ViewIdF(RefPicListX[cIdx]) is the viewId of the picture RefPicListX[cIdx].

Within this pseudo-code procedure, the length of the list RefPicListX is temporarily made one element longer than the length needed for the final list. After the execution of this procedure, only elements 0 through num_ref_idx_IX_active_minus1 of the list need to be retained.

A scheme for reordering reference picture lists for long-term reference pictures is described below:
Input to this process is an index refIdxLX (with X being 0 or 1).
Output of this process is an incremented index refIdxLX.
The following procedure is conducted to place the picture with long-term picture number long_term_pic_num that is present in view indicated by viewIdX as derived above into the index position refIdxLX, shift the position of any other remaining pictures to later in the list, and increment the value of refIdxLX.

```
for( cIdx = num_ref_idx_IX_active_minus1 + 1;
cIdx > refIdxLX; cIdx-- )
    RefPicListX[ cIdx ] = RefPicListX[ cIdx - 1 ]
RefPicListX[ refIdxLX++ ] = long-term reference picture with
LongTermPicNum equal to long_term_pic_num and viewId equal
to viewIdLX nIdx = refIdxLX
for( cIdx = refIdxLX; cIdx <= num_ref_idx_IX_active_minus1 + 1;
cIdx++ )
    if( (LongTermPicNumF( RefPicListX[ cIdx ] ) !=
long_term_pic_num ) && ViewIdF(RefPicListX[ cIdx ] ]) !=
viewIdLX)
        RefPicListX[ nIdx++ ] = RefpicListX[ cIdx ]
```

The function LongTermPicNumF(RefPicListX[cIdx]) is derived as follows:

If the picture RefPicListX[ cIdx ] is marked as "used for long-term reference", LongTermPicNumF( RefPicListX[ cIdx ] ) is the LongTermPicNum of the picture RefPicListX[ cIdx ].
Otherwise (the picture RefPicListX[ cIdx ] is not marked as "used for long-term reference"), LongTermPicNumF ( RefPicListX[ cIdx ] ) is equal to 2 * ( MaxLongTermFrameIdx + 1 ).

NOTE 1
A value of 2 * ( MaxLongTermFrameIdx + 1) can never be equal to long_term_pic_num.

The function ViewIdF(RefPicListX[cIdx]) is derived as follows:

If the picture RefPicListX[ cIdx ] is marked as "used for short-term reference", ViewIdF( RefPicListX[ cIdx ] ) is the viewId of the picture RefPicListX[ cIdx ].
Otherwise (the picture RefPicListX[ cIdx ] is not marked as "used for short-term reference"), PicNumF( RefPicListX[ cIdx ] ) is equal to MaxPicNum.

A value of MaxPicNum can never be equal to picNumLX.
Note that within this pseudo-code procedure, the length of the list RefPicListX is temporarily made one element longer than the length needed for the final list. After the execution of this procedure, only elements 0 through num_ref_idx_IX_active_minus1 of the list need to be retained.

In a second embodiment of the present invention under this alternative framework considers that the reordering of the cross-view pictures will most often happen for temporally aligned pictures, which means that the picture number difference will be zero. Hence, this embodiment is focuses on this aspect of reordering cross-view pictures which is more efficient than described above.

This embodiment changes the variable abs_diff_pic_num_minus1 to abs_diff_pic_num and defines the variable as follows:

abs_diff_pic_num specifies the absolute difference between the picture number of the picture being moved to the current index in the list and the picture number prediction value.

The range of abs_diff_pic_num is specified as follows.
  If reordering_of_pic_nums_idc is equal to 0, abs_diff_pic_num shall be in the range of 0 to MaxPicNum/2.
  Otherwise (reordering_of_pic_nums_idc is equal to 1), abs_diff_pic_num_minus1 shall be in the range of 0 to MaxPicNum/2-1.
By doing this we allow for abs_diff_pic_num to take a value of 0 which would be the most often case for the cross-view reordering.

A third embodiment is also proposed under the alternative framework, which is also used to consider that reordering of the cross-view pictures will most often happen for temporally aligned pictures, which means that the picture number difference will be zero.

In previous methods, abs_diff_pic_num is coded as unsigned Exp-Golomb code thus additional syntax to indicate whether this difference represents positive or negative difference needs to be send as shown in FIG. 6 as mvc_reordering_of_pic_nums_idc.

Figure 7:
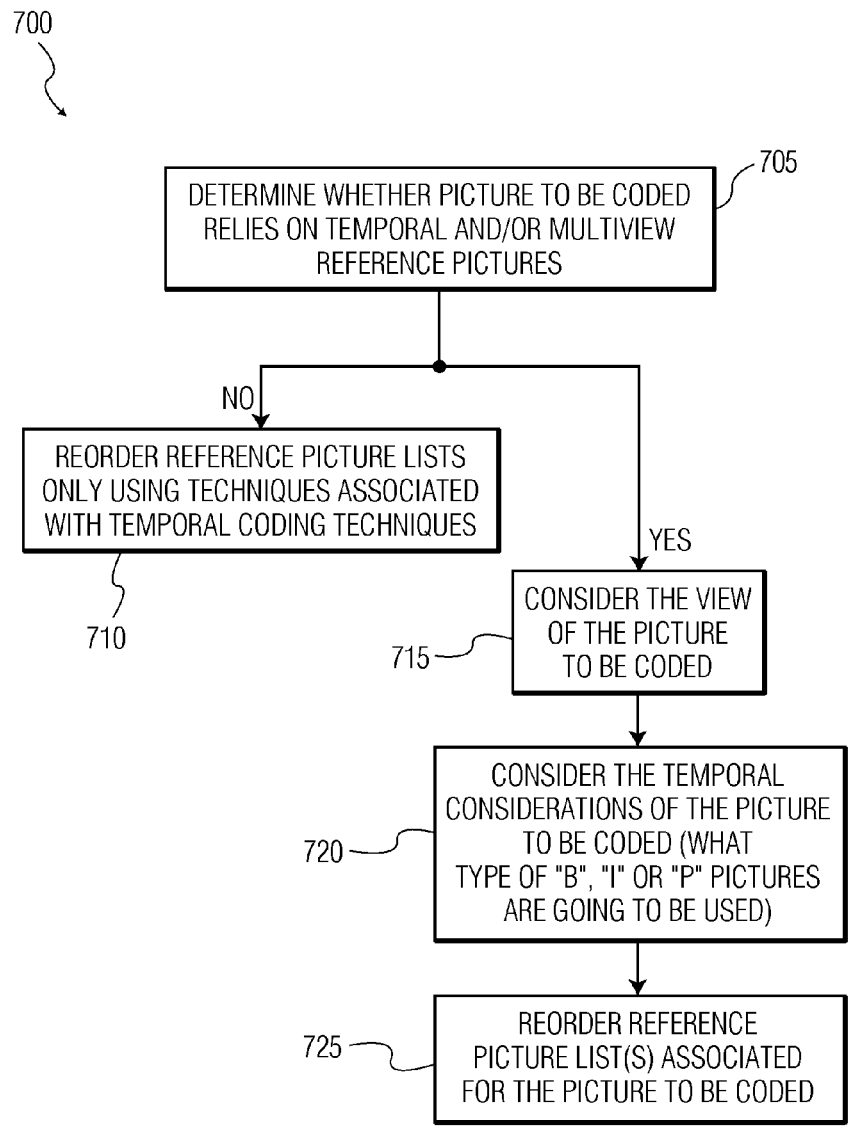
FIG. 7 presents a block diagram of an embodiment of a picture reference list reordering method in accordance with principles of the present invention

This embodiment reduces the values that this syntax element can take as shown in TABLE 2 and transmit a signed Exp-Golomb code for the difference of the picture number as diff_pic_num as shown in FIG. 7 which discloses a revised definition for the RPPL ref_pic_list_reordering_mvc_extension.

TABLE 2

| mvc_reordering_of_pic_nums_idc | Reordering specified |
| --- | --- |
| 0 | diff_pic_num is present and corresponds to a difference to subtract from a picture number prediction value |
| 1 | long_term_pic_num is present and specifies the long-term picture number for a reference picture |
| 2 | End loop for reordering of the initial reference picture list |

The semantics of diff_pic_num can then be defined as: diff_pic_num specifies the difference between the picture number of the picture being moved to the current index in the list and the picture number prediction value. The range of diff_pic_num is specified as follows.

MaxPicNum/2−1 to MaxPicNum/2.

picNumLXNoWrap is then derived as follows:

picNumLXNoWrap=picNumLXPred+diff_pic_num.

FIG. 7 presents a block diagram 700 representing the principles of the present invention as applied to the reordering of reference pictures for a multiview coding environment. For purposes of the operation of this flowchart, it is assumed that reference pictures are already present in a DPB 215. The reference pictures however may be for different views.

In step 705, the method considers whether the present picture to be coded is within an environment where multiview pictures (MVC and AVC) are used or whether the coding environment is simply temporal (i.e. AVC).

If the reference pictures used in conjunction for the coding of present picture have nothing to do with multiview coding, step 710 operates as to apply the principles known in association with a coding standard like AVC to reorder the reference picture lists If the picture to be coded however is related to multiview pictures, where it is possible that cross-view relationships between pictures may have to be considered, step 715 is selected.

As described above, there are several different applications as to how to actually perform the reordering of pictures. Some embodiments presented above (as applied for step 715) describe an environment where a comparison is made to consider whether the present picture to be coded has any cross-view relationships with reference pictures. In some embodiments, the reorder of picture lists would reorder reference pictures associated with any view. In other embodiments, the reordering reference pictures is first done for all cross views, and then for the reference pictures with the same view as the picture being coded.

Step 720 considers whether the picture to be coded will have a temporal relationship to the reference pictures. As described above, when P pictures make use of one reference list while a "B" picture may require the use of two reference lists. Hence, the way the lists are reordered (as described in various embodiments of the present invention) depends on such temporal relationships.

Step 725 is the actual reordering of the reference picture lists. The various ways to perform such operations, once again, depends on the results of steps 715 and 720, and are to be applied in conjunction with the principles and embodiments described above.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("110") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for the ordering of a reference picture lists for a multiview based video decoding operation where reference pictures associated with a plurality of views are used for coding a video picture comprising the steps of:
   determining using a video coder whether a first reference picture is a temporal reference picture for said video picture to be coded and modifying an ordering of a coding order of reference pictures in a temporal reference picture list by assigning said first reference picture a picture number used for said temporal reference picture list where said picture number depends on whether said first reference picture is an I, B, or P picture, whether said picture to be coded is an I, B, or P picture, a decoding order of said video picture to be coded in a plurality of coded pictures, and a display order of said video picture to be coded in said plurality of coded pictures;
   determining whether said video picture to be coded is associated with a view from said plurality of views from different view points; and
   modifying an ordering a coding of a second reference picture in a crossview reference picture list in the same coding operation, with the crossview reference picture list being a different picture list than the temporal reference picture list, when the corresponding viewpoint representing the view of the picture to be coded and said second reference picture is associated with a view different than associated with said video picture to be coded as to assign the second reference picture a second picture number for said crossview reference picture list where the second picture list number depends on whether said second reference picture is an I, B, or P picture, whether said picture to be coded is an I, B, P picture, said decoding order of said video picture to be coded in a plurality of coded pictures, and said display order of said video picture to be coded in said plurality of coded pictures, wherein
   said first reference picture is a temporal reference picture list;
   said second reference list is a cross-view reference picture list;
   said reference pictures have a first field indicating a number of references and a second field indicating a view point; and
   when the two reference pictures have a different value in the second field, a long term index is assigned to the cross view reference picture list: so that said long term index can be used to modify the order of a second reference picture in a cross-view reference picture list.

2. The method of claim 1, wherein one temporal reference picture list is used if said picture to be coded is a "P" picture, and two temporal reference picture lists are used is said picture to be coded is a "B" picture.

3. The method of claim 1 comprising the additional step of deleting said first reference picture from a picture buffer when a use of said first reference picture for decoding more video pictures to be coded is finished.

4. The method of claim 1 comprising the additional step of deleting said second reference picture from a picture buffer when a use of said second reference picture for decoding more video pictures to be coded is finished.

5. An apparatus that orders of a reference picture lists for a multiview based video decoding operation where reference pictures associated with a plurality of views are used for coding a video picture comprising:
   a processor configured to determine, for a video coder, whether a first reference picture is a temporal reference picture for said video picture to be coded and modifying an ordering of a coding order of reference pictures in a temporal reference picture list by assigning said first reference picture a picture number used for said temporal reference picture list where said picture number depends on whether said first reference picture is an I, B, or P picture, whether said picture to be coded is an I, B, or P picture, a decoding order of said video picture to be coded in a plurality of coded pictures, and a display order of said video picture to be coded in said plurality of coded pictures;
   a processor configured to determine whether said video picture to be coded is associated with a view from said plurality of views from different view points; and
   a processor configured to modify an ordering a coding of a second reference picture in a crossview reference picture list in the same coding operation, with the crossview reference picture list being a different picture list than the temporal reference picture list, when the corresponding viewpoint representing the view of the picture to be coded and said second reference picture is associated with a view different than associated with said video picture to be coded as to have said processor configured to modify assign the second reference picture a second picture number for said crossview reference picture list where the second picture list number depends on whether said second reference picture is an I, B, or P picture, whether said picture to be coded is an I, B, P picture, said decoding order of said video picture to be coded in a plurality of coded pictures, and said display order of said video picture to be coded in said plurality of coded pictures, wherein said first reference picture is a temporal reference picture list;

said second reference list is a cross-view reference picture list;

said reference pictures have a first field indicating a number of references and a second field indicating a view point; and when the two reference pictures have a different value in the second field, a long term index is assigned to the cross view reference picture list; so that said long term index can be used to modify the order of a second reference picture in a cross-view reference picture list.

6. The apparatus of claim 5, wherein one temporal reference picture list is used if said picture to be coded is a "P" picture, and two temporal reference picture lists are used is said picture to be coded is a "B" picture.

7. The apparatus of claim 5 comprising a processor configured to delete said first reference picture from a picture buffer when a use of said first reference picture for decoding more video pictures to be coded is finished.

8. The apparatus of claim 5 comprising a processor configured to delete said second reference picture from a picture buffer when a use of said second reference picture for decoding more video pictures to be coded is finished.

\* \* \* \* \*